(12) United States Patent
Van Duyn (10) Patent No.: US 6,746,143 B1
(45) Date of Patent: Jun. 8, 2004

(54) VARIABLE PROGRESSIVE BEAM HEADLAMP

(75) Inventor: Paul D. Van Duyn, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/400,848

(22) Filed: Mar. 27, 2003

(51) Int. Cl.[7] .............................................. F21W 10/10
(52) U.S. Cl. ...................... 362/539; 362/538; 362/512; 362/282; 362/322
(58) Field of Search ................................ 362/538, 539, 362/507, 509, 512, 282, 283, 284, 277, 319, 322, 323, 324

(56) References Cited

U.S. PATENT DOCUMENTS

| | | | |
|---|---|---|---|
| 4,305,119 A | 12/1981 | Draper et al. | 362/309 |
| 4,967,319 A | 10/1990 | Seko | 362/61 |
| 5,067,054 A | 11/1991 | Oshio et al. | 362/61 |
| 5,195,815 A | 3/1993 | Watanabe et al. | 362/61 |
| 5,673,990 A | 10/1997 | Neumann et al. | 362/61 |
| 5,899,559 A | 5/1999 | Lachmayer et al. | 362/513 |
| 6,007,221 A | * 12/1999 | Taniuchi et al. | 362/465 |
| 6,457,849 B2 | * 10/2002 | Tsukamoto | 362/509 |
| 6,565,245 B2 | * 5/2003 | Yokoi | 362/512 |
| 2002/0039289 A1 | 4/2002 | Kinouchi | 362/214 |

FOREIGN PATENT DOCUMENTS

| | | |
|---|---|---|
| EP | 0 690 261 A1 | 1/1996 |
| GB | 2370 104 A | 6/2002 |
| JP | 8-298003 | 11/1996 |
| JP | 2001-52509 | 2/2001 |
| JP | 2001-143505 | 5/2001 |
| JP | 2002-56707 | 2/2002 |
| JP | 2002-56708 | 2/2002 |

* cited by examiner

Primary Examiner—Laura K. Tso
(74) Attorney, Agent, or Firm—Ice Miller; Russell E. Fowler, II (57) ABSTRACT

A vehicular headlamp in which the radial beam of radiated light is continuously adjustable between a first position and a second position. Semi-cylindrical lamp shields surround a lamp. The lamp shields are attached to gears which operate to rotate the lamp shields radially about the lamp. An actuator is attached to the gears, such the actuator can turn the gears in order to rotate the lamp shields. The actuator is controlled by a circuit which prevents over-rotation. The actuator may move in very small increments, such that the lamp shields may be continuously adjustable between the first position and the second position. The lamp shields are thus continuously adjustable to vary the projected radial beam of the headlamp.

25 Claims, 9 Drawing Sheets

VARIABLE PROGRESSIVE BEAM HEADLAMP

BACKGROUND

The modern automobile consumer is often intrigued and impressed by various functional features and styling designs that have little to do with automobile performance, and more to do with the overall look and style of the automobile. Extra features added to automobiles may incline a consumer to purchase one automobile over another. To this end, automobile manufacturers consider extra automobile features to be advantageous, and headlamp manufacturers continually try to improve the stylization and functional features offered with headlamps and tail lamps. Accordingly, it is advantageous to provide unique and impressive features for headlamps, which may attract the interest of consumers and draw attention to the stylization of the vehicle.

This invention relates to a variable progressive beam headlamp, where the headlamp projects a continuously variable radial arc of light. The ability to vary the radial arc of light emitted from the headlamps is intended as an extra automobile feature in order to interest prospective customers. The mechanism to vary the radial arc of projected light may be operated by a human operator, or may be operated by a computer controller, in order to lend extra style and functionality to the headlamp, and therefore to the automobile. Such an extra feature may influence the customer's buying decision.

Additionally, a variable progressive beam headlamp may offer added functionality to the headlamp assembly. The ability to vary the amount of light reflected out of the headlamp assembly may provide useful features. For example, radial variability in emitted light may offer advantages for integrating "high beam" and "low beam" functionality into a single headlamp assembly. Also, the ability to project emitted light onto selective areas of a surface may be improved, reducing unwanted or uncontrolled light emissions from the headlamp assembly.

SUMMARY

A variable beam headlamp comprises a housing and a support structure attached to the housing. A lamp is positioned within the housing. Attached therein to the support structure are a first lamp shield and a second lamp shield. The first lamp shield and the second lamp shield are partially cylindrical, with a portion of each of the lamp shields having a greater cylindrical arc. The first lamp shield and the second lamp shield are positioned in the housing so as to surround the lamp. An actuator is attached to the support structure, and is in communication with both the first lamp shield and the second lamp shield, such that the actuator may operate to rotate the first lamp shield and the second lamp shield about the lamp. In this way, the radial arc of illumination projected from the headlamp is variable. The actuator is capable of operating on the first lamp shield and the second lamp shield to move about the lamp in small increments, thus appearing that the radial arc of illumination projected from the headlamp is continuously variable between a first position and a second position.

The actuator may be comprised of an electric motor which is operable to rotate an electric motor shaft. The actuator may further comprise a first drive gear, attached to the motor drive shaft, a second drive gear, in communication with the first drive gear, and a first fan gear and second fan gear, in communication with the first drive gear and the second drive gear, respectively. The first fan gear is attached to the first lamp shield, and the second fan gear is attached to the second lamp shield, such that rotation of the motor drive shaft ultimately results in rotation of the first lamp shield and the second lamp shield about the lamp.

A decorative cap may be attached to the support structure, to shield the support structure and associated components from view.

A headlamp control system is operable on the actuator, so that the headlamp control system may act to rotate the first lamp shield and the second lamp shield about the lamp. The headlamp control system controls the amount of rotation of the first lamp shield and the second lamp shield about the lamp, and prevents over rotation. The headlamp control system may be operated under human control, using a switch, or may be controlled by the vehicle's computer system.

These and other advantages and features of the present invention shall hereinafter appear, and for the purposes of illustration, but not limitation, exemplary embodiments of the present invention shall hereinafter be described.

DETAILED DESCRIPTION

Figure 1:
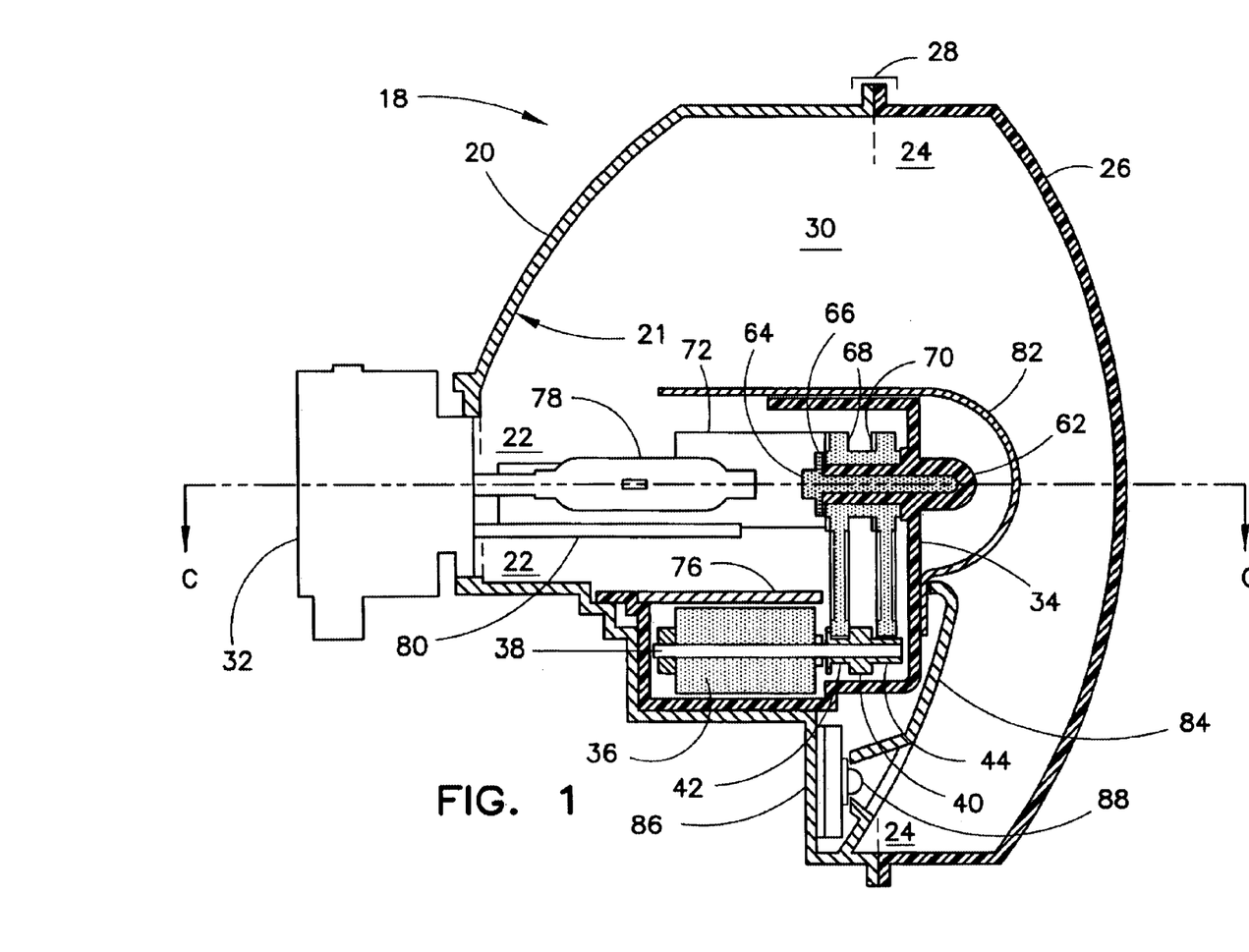
FIG. 1 is a side cross sectional view of a headlamp assembly.

With reference to FIG. 1, a variable progressive beam headlamp 18 comprises a lamp 78 positioned within a housing 20. A first lamp shield 72 and a second lamp shield 74 (not shown in FIG. 1) are positioned about the lamp 78. A first gear mechanism is attached to the first lamp shield 72 and a second gear mechanism is attached to the second lamp shield 74. An electric motor 36 attached to the housing 20 drives the first gear mechanism and second gear mechanism to rotate the first bulb shield 72 and the second bulb shield 74, respectively, radially about the bulb 78. Operation of the first lamp shield 72 and the second lamp shield 74 about the lamp 78 serves to vary the amount of shielding between the lamp 78 and the housing 20, and thus the amount of light which is reflected out of the headlamp 18.

One embodiment of a variable progressive beam headlamp is provided as shown in FIG. 1, and is generally indicated as numeral 18. The outside of the headlamp is formed from a housing 20, and a lens 26. The housing 20 contains two openings, a first housing opening 22 and a second housing opening 24. The first housing opening 22 is a comparatively smaller opening than the second housing opening 24. The first housing opening 22 is dimensioned to receive a standard electrical socket and bulb for headlamps. The second housing opening 24 is a comparable diameter to the lens 26. The walls of the housing 20 and the lens 26 abut one another, and are sealed at seal attachment 28. The seal may be accomplished in one of a number of ways known in the art. The union of the housing 20 and the lens 26 defines a cavity 30. The lens 26 is manufactured from a transparent material, and may have optics integrated into the lens 26, which serve to focus or angle emitted light rays. The lens 26 may be made from a material which allows light of a certain wavelength or range of wavelengths to pass, therefore imparting a distinct color to light radiated outside of the cavity 30. A reflector 21 is formed on the inside surface of the housing 20. The reflector 21 faces the cavity 30, and may be formed by coating a portion of the inside housing 20 with a material which reflects light rays. Techniques for coating the inside surface of the housing 20 with a reflective material, or forming the housing 20 out of a reflective material, are well known in the art. In an alternate embodiment, the reflector 21 is formed separately from the housing 20, and deposited within the housing 20.

A support structure 34 is created from a rigid material, and is attached to the inside surface of the housing 20, which faces the cavity 30. The support structure 34 provides a framework and point of attachment for further components inside the cavity 30, as defined below.

An electric motor 36 is mounted to the support structure 34 inside the cavity 30. The electric motor 36 is connected to electrical leads (not shown), which distribute electricity from the automobile's electrical system to the electric motor 36, through a headlamp control system (not shown). The electric motor 36 operates, upon the application of an electric current, to rotate a motor drive shaft 38, which is located in the center of the electric motor 36. The electric motor 36 may rotate the motor drive shaft 38 clockwise or counterclockwise, depending on the application of the electric current to the electric motor 36. The electric motor 36 is capable of rotating the motor drive shaft 38 in very small angular increments.

Figure 2:
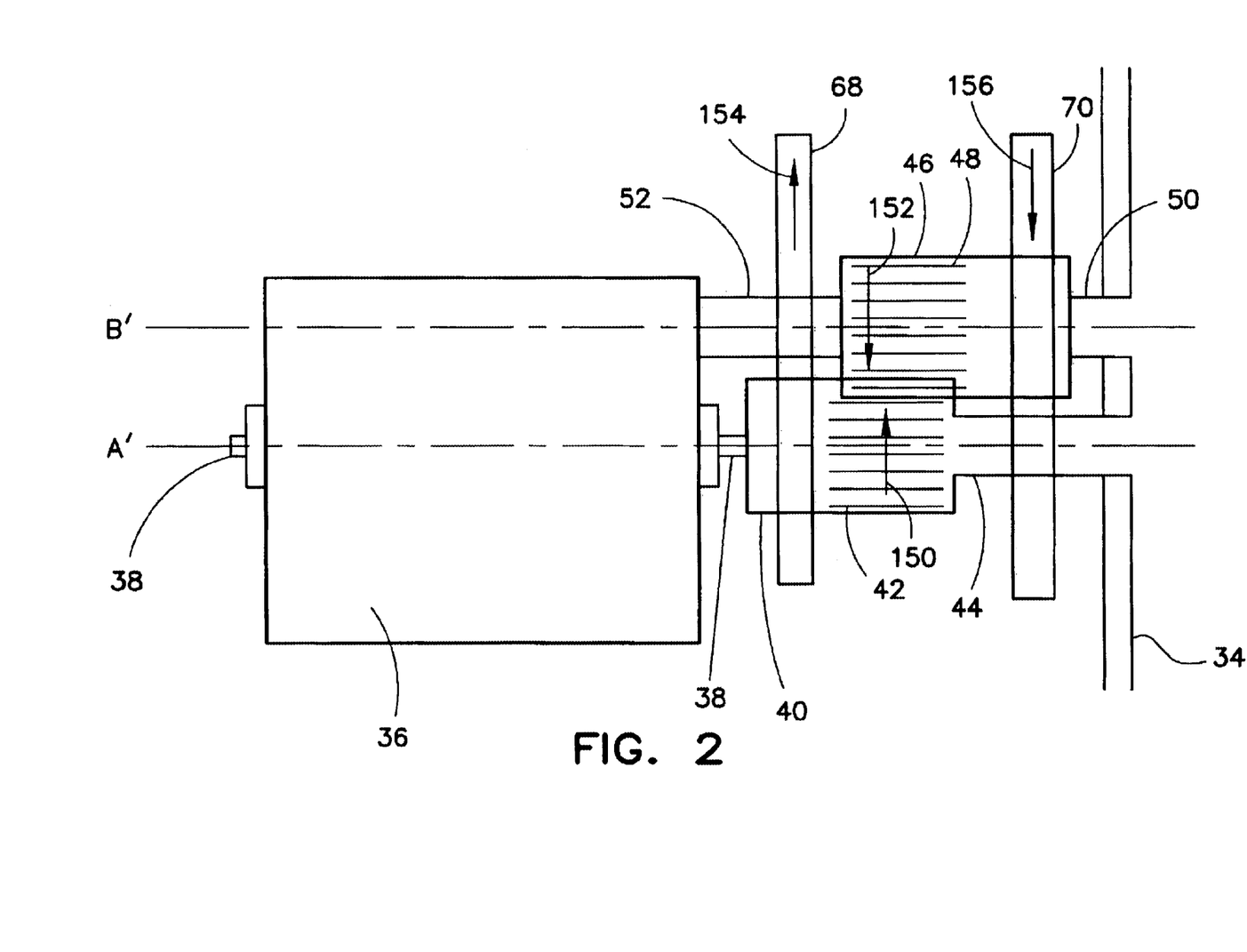
FIG. 2 is a top view of an electric motor, first and second drive gears, and first and second fan gears of the headlamp assembly of FIG. 1.

With reference to FIGS. 1 and 2, a first drive gear 40 is positioned upon the motor drive shaft 38 of the electric motor 36. The first drive gear 40 includes a plurality of first drive gear teeth 42 radially positioned about the motor drive shaft 38 and a first cylindrical cap 44 adjacent to the first drive gear teeth 42. The first cylindrical cap 44 is inserted into an opening in the support structure 34, such that the first drive gear 40 may rotate freely about its cylindrical axis A', but is otherwise fixed in place. The motor drive shaft 38 extends through the first drive gear 40, through the first cylindrical cap 44, and into an opening in the support structure 34. The first drive gear 40 is fixed upon the motor drive shaft 38, such that the first drive gear teeth 42 of the first drive gear 40 rotate at the same speed as the motor drive shaft 38 about cylindrical axis A'.

A second drive gear 46 is cylindrical, and has a second cylindrical cap 52 and a third cylindrical cap 50 on the left and right side of the second drive gear, respectively, such that the second drive gear 46 is offset, but between, the second cylindrical cap 52 and the third cylindrical cap 50. The second drive gear 46 includes a plurality of second drive gear teeth 48 radially positioned about the second drive gear 46. The first drive gear teeth 42 and the second drive gear teeth 48 are of similar width and height. The second cylindrical cap 52, and the third cylindrical cap 50 have similar diameters, and together form the shaft that holds the second drive gear 46. The third cylindrical cap 50 is inserted into an opening that forms a bearing in the support structure 34, and a post (not shown) attached to the electric motor 36 is inserted into an opening (not shown) in the second cylindrical cap 52, such that the second drive gear 46 may rotate freely about its cylindrical axis B', but is otherwise fixed in place.

The second drive gear 46 is parallel to the first drive gear 40, such that the first drive gear and second drive gear are offset but the teeth of the first drive gear are in contact with and mesh with the teeth of the second drive gear. Furthermore, the first drive gear 40 and the second drive gear 46 also have similar diameters, such that the first drive gear 40 and the second drive gear 46 rotate at the same speed when the first drive gear drives 40 the second drive gear 46.

Figure 6:
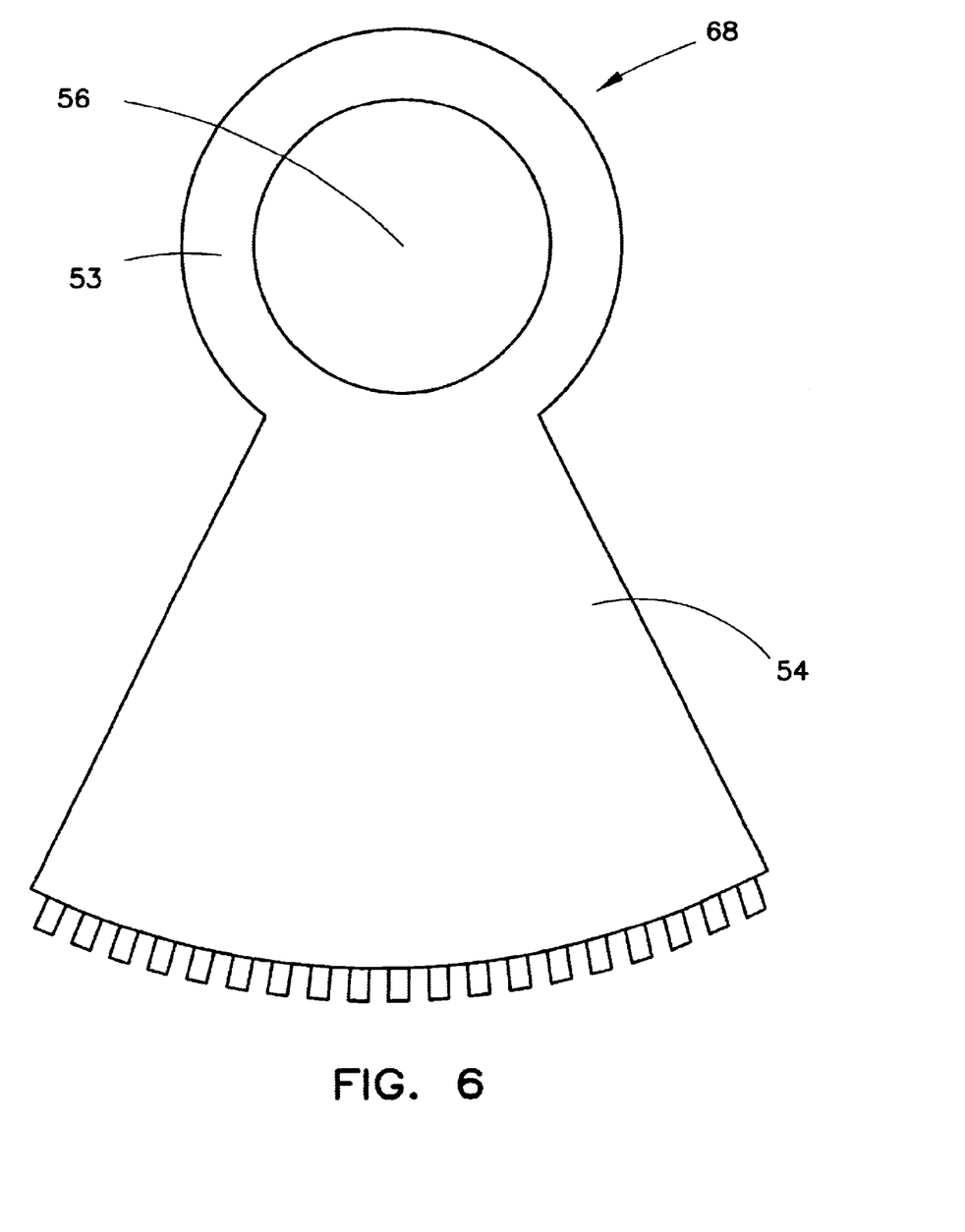
FIG. 6 is a component view of a first fan gear.

The first fan gear 68 and the second fan gear 70 are similar in physical characteristics, but differ in placement in the headlamp assembly 18. A front view of the first fan gear is shown in FIG. 6. The first fan gear 68 consists of a circular ring 53, an opening 56, and a semi-circular fan shaped structure 54. The circular ring 53 is used as an attachment point for a first lamp shield 72. The fan-shaped structure 54 contains gear teeth along the periphery, which are of a complimentary style and designed to mesh with the first drive gear teeth 42.

Referring again to FIG. 1, the support structure 34 forms a hollow, cylindrical post 62, which has an outer diameter that is of comparable diameter to the inner diameter of the circular opening 56 of the first fan gear such that the circular opening 56 of the first fan gear 68 rides on the hollow, cylindrical post 62. A second fan gear 70 is similar to the first fan gear 68. The circular opening 57 of the second fan gear 70, is inserted over the hollow, cylindrical post 62 of the support structure 34. The circular opening 56 of the first fan gear 68, is then inserted over the hollow, cylindrical post 62 of the support structure 34. A pin 64 and washer 66 are inserted into the hollow section of the hollow, cylindrical post 62, such that removal of the first fan gear 68 and the second fan gear 70 from the hollow, cylindrical post 62 is hindered. Thus, the first fan gear 68 and the second fan gear 70 may rotate freely about the hollow, cylindrical post 62 of the support structure 34, but are otherwise fixed in place. The fan-shaped structure 54 of the first fan gear 68 extends downwardly, such that the gear teeth along the periphery of the fan-shaped structure 54 mesh with the first drive gear teeth 42. Similarly, the fan-shaped structure 55 of the second fan gear 70 extends downwardly, such that the gear teeth along the periphery of the fan-shaped structure 55 mesh with the second drive gear teeth 48.

Figure 4:
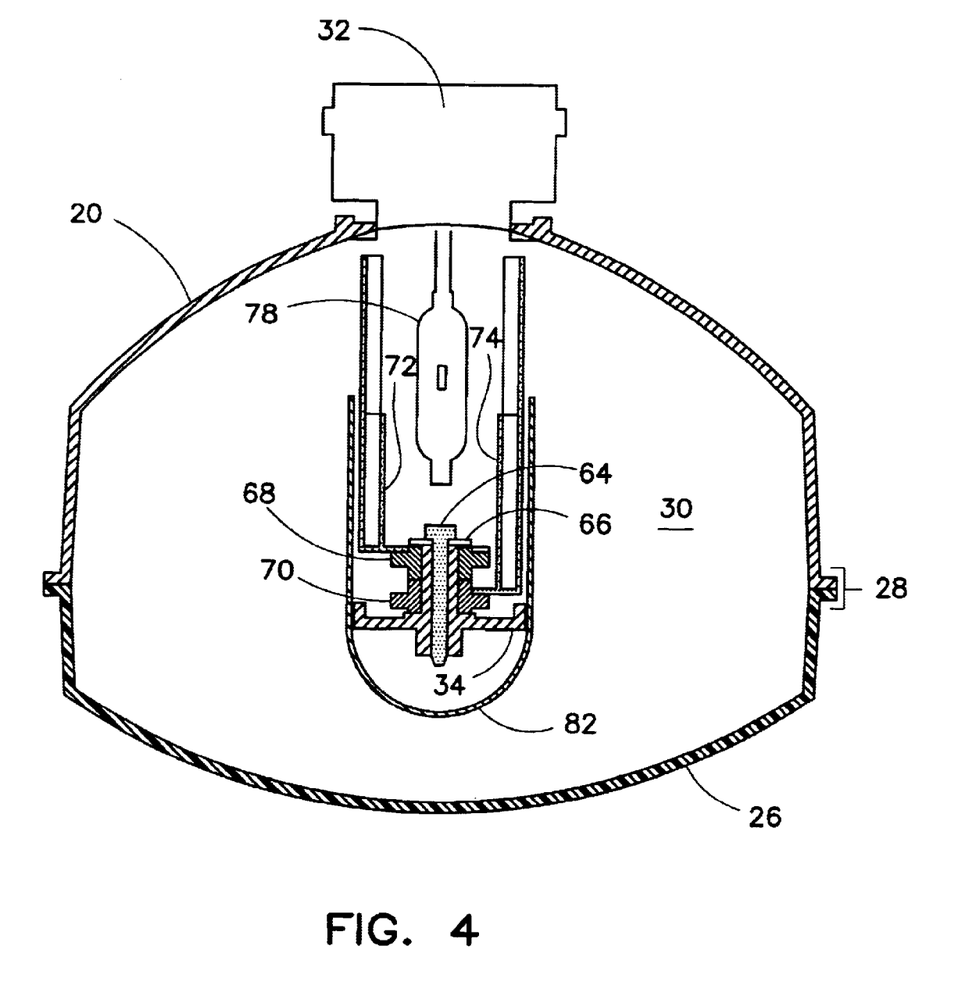
FIG. 4 is a top cross sectional view of the headlamp assembly along line C—C of FIG. 1.
Figure 5:
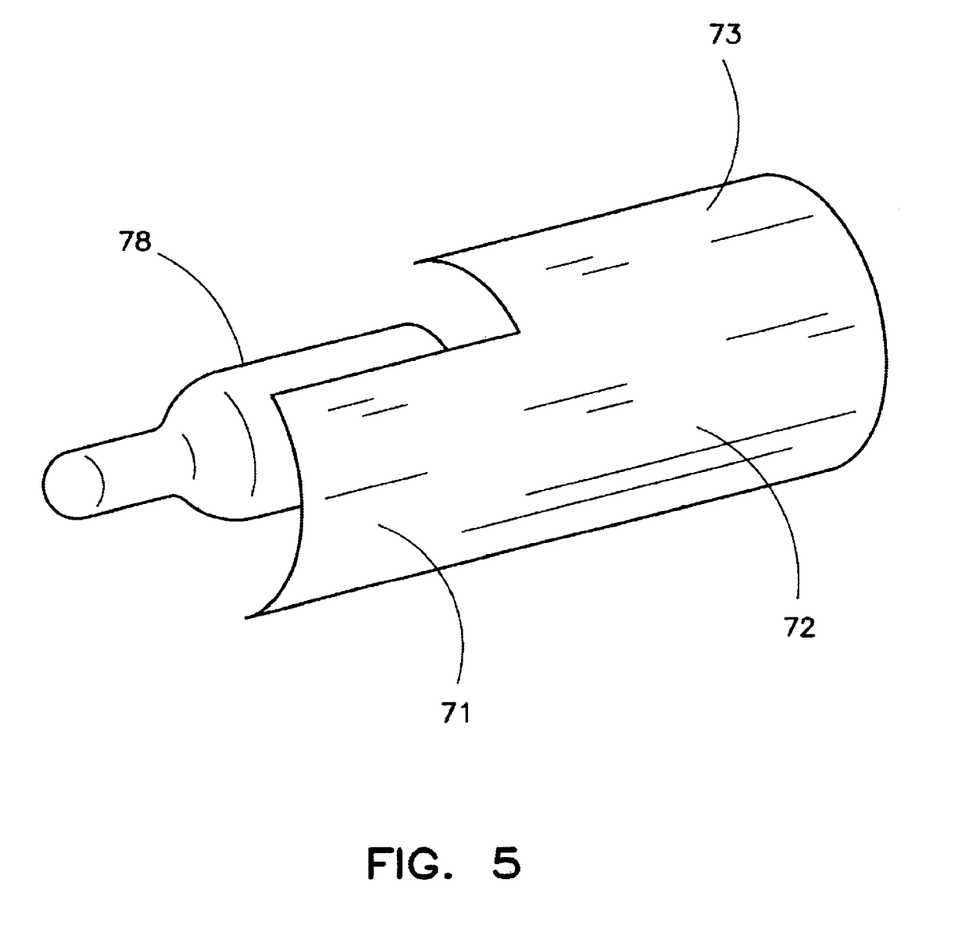
FIG. 5 is a component view of a lamp and first lamp shield of the headlamp assembly of FIG. 1.

A first lamp shield 72 is attached to the first fan gear 68. The first lamp shield 72 is semi-cylindrical, and is manufactured from an opaque, substantially non-reflective material. A second lamp shield 74 is attached to the second fan gear 70. FIG. 5 shows an exploded view of the first lamp shield 72 and the lamp 78. The first lamp shield 72 comprises a first semi-cylindrical wall 71 integral with a second semi-cylindrical wall 73. The second semi-cylindrical wall 73 is of a greater cylindrical arc than the first semi-cylindrical wall 71. The second semi-cylindrical wall 73 is attached to the first fan gear 68. Referring now to FIG. 4, the second lamp shield 74 is a mirror image of the first lamp shield 72, and is therefore described similarly to the first lamp shield 72. FIG. 4 shows a top cut-away view of the headlamp assembly 18 along the C—C line of FIG. 1. FIG. 4 shows the first lamp shield 72 and second lamp shield 74 attached the circular ring 53 and the circular ring 51 of the first fan gear 68 and the second fan gear 70, respectively. For purposes of clarification, the electric motor 36, the electric motor shaft 38, the first drive gear 40, the second drive gear 46, the first fan gear 68, and the second fan gear 70 may be considered together as an "actuator", which directly controls the first lamp shield 72 and the second lamp shield 74. Notwithstanding the foregoing, the term "actuator", as used herein, is not limited to the aforementioned collection and arrangement of parts.

Referring again to FIG. 1, a motor heat shield 76 is attached to the support structure 34, above the electric motor 36. As the lamp 78 is energized, it produces thermal energy as a byproduct of light emission. The motor heat shield 76 provides a thermal barrier between the energized lamp 78 and the electric motor 36, to prevent the electric motor 36 from overheating.

A lamp 78 is attached to a standard electrical socket 32. The electrical socket 32 is releasably attached to the housing 20 at the second housing opening 22. When the electrical socket is attached to the housing 20, the lamp 78 enters the cavity 30 through the first housing opening 22. The electrical socket 32 provides an electrical attachment point to the automobile's electrical system. The concept of an electrical socket 32 and lamp 78 is well understood and practiced in the art. Of course, the lamp may be any of the headlamp lamps known in the art, for example, incandescent, halogen, high-intensity gas discharge, or one or more light-emitting diodes.

When inserted into the housing 20, the lamp 78 extends from and is supported by the electrical socket 32, and extends between the first lamp shield 72 and second lamp shield 74. An insulated electrical lead 80 carries electricity from the automobile's electrical system to the lamp 78.

A decorative cap 82 is attached to the support structure 34. The decorative cap 82 obscures the upper section of the support structure 34 and associated components from outside view. The decorative cap 82 also partially covers the lamp 78, to block emitted light from exiting the cavity 30 without first striking the reflective surface on the inside of the housing 20. Uncontrolled light rays can cause unwanted glare, which is minimized by the partial extension of the decorative cap 82 over the lamp 78.

A decorative plate 84 is attached to the housing 20 and the support structure 34. The decorative plate 84 is used to obscure the lower section of the support structure 34 and associated components from outside view. The decorative plate 84 may be formed or coated with a reflective material, according to well established techniques known in the art.

In an alternate embodiment of the present invention, one or more light-emitting diode (LED) assemblies 86 are attached to the housing 20. The LED assemblies 86 receive electricity from electrical leads (not shown), which distribute electricity from the automobile's electrical system to the LED assemblies 86. The LED assemblies 86 each contain electrical and mechanical attachment points for an LED lamp 88. One or more openings in the decorative plate 84 allow the LED lamp 88 attached to the LED assemblies 86 to emit light into the cavity 30, and out of the headlamp assembly 18 through the lens 26. Any color of LED lamp may be used with the LED assemblies 86, as the LED assemblies 86 may be used to either augment emitted light from the lamp, or change the overall color of the emitted light from the headlamp assembly 18.

A headlamp control system (not shown) is connected to the electric motor. The headlamp control system (not shown) may be a microprocessor or another form of circuit, which receives input from either the automobile's primary microprocessor, or from a switch which is under human operation. The headlamp control system (not shown) controls the duration and rotational direction of motor drive shaft 38 rotation by selectively applying an electric current to the electrical leads which are connected to the electric motor 36. The headlamp control system (not shown) also controls the illumination of the lamp 78 and the LED assemblies 86, if present. The headlamp control system (not shown) also prevents over-rotation of the motor drive shaft 38.

Operation of the disclosed embodiment of the variable progressive beam headlamp is now described with reference to FIGS. 1–4. The headlamp control system (not shown) receives input from the automobile's primary microprocessor, or from a human-operated switch, and energizes the electrical leads which are attached to the electric motor 36. The application of an electric current to the electric motor 36 causes the electric motor 36 to operate upon the motor drive shaft 38, rotating the motor drive shaft 38 for a specific duration and in a specific rotational direction as described by the headlamp control system (not shown).

Referring now to FIG. 2, a top view of the electric motor 36, first drive gear 40, second drive gear 46, and the relative rotation of first fan gear 68 and second fan gear 70 is shown. For reference, arrows are included on each gear to indicate the direction of rotation, when the electric motor 36 rotates the motor drive shaft 38 clockwise. Of course, if the electric motor 36 rotates the motor drive shaft 38 counterclockwise, the direction of each of the gears, and the arrows illustrated in FIG. 2, would be reversed.

As illustrated, the motor drive shaft 38 rotates clockwise (as indicated by arrow 150) about axis A'. The first drive gear 40 is affixed to and in communication with the motor drive shaft 38, causing the first drive gear 40 to rotate about axis A' in the direction of the motor drive shaft 38. The gear teeth on the first drive gear 40 mesh with the gear teeth on the second drive gear 46. The gear teeth of the first drive gear 40 and the second drive gear 46 mesh in such a way that when the first drive gear 40 is driven to rotate about its cylindrical axis A' in a clockwise direction, the first drive gear 40 operates on the second drive gear 46 to rotate the second drive gear 46 about its cylindrical axis B' in a counterclockwise direction at the same rate as the first drive gear 40 (as indicated by arrow 152). Similarly, if the first drive gear 40 is driven to rotate in a counterclockwise direction, the first drive gear 40 operates on the second drive gear 46 such that the second drive gear 46 rotates in a clockwise direction at the same rate as the first drive gear 40.

As first fan gear 68 is in communication with first drive gear 40, and second fan gear 70 is in communication with the second drive gear 46, motion of the first drive gear 40 and second drive gear 46 translates into motion of the first fan gear 68 and second fan gear 70. Referring still to FIG. 2, the relative motion of first fan gear 68 and second fan gear 70 is indicated, given a clockwise motion of the motor drive shaft 38 and first drive gear 40. A clockwise motion of first drive gear 40 about axis A' rotates first fan gear 68 in a counterclockwise direction about the hollow, cylindrical post 62 of the support structure 34 (as indicated by arrow 154). Similarly, the clockwise motion of the first drive gear 40 serves to impart a counterclockwise rotation of the second drive gear 46 about axis B', which in turn imparts a counterclockwise rotation to the second fan gear 70 about hollow, cylindrical post 62 of the support structure 34 (as indicated by arrow 156). It should be noted that rotation of the motor drive shaft 38, with the aforementioned arrangement of gears, causes the first fan gear 68 and the second fan gear 70 to rotate at the same rate, but in different directions.

The rotational motion of the first fan gear 68 and the second fan gear 70 imparts a rotational motion on the first lamp shield 72 and the second lamp shield 74, respectively. In the present embodiment, the first lamp shield 72 and the second lamp shield 74 are positioned for maximum lamp shielding when the first fan gear 68 and the second fan gear 70 are located in a "closed" position, and the radial arc of light emitted from the headlamp is minimized, thus creating a low radial arc of illumination. Conversely, the first lamp shield 72 and the second lamp shield 74 are positioned for minimum lamp shielding when the first fan gear 68 and the second fan gear 70 are located in an "open" position, and the radial arc of light emitted from the headlamp is maximized, thus creating a high radial arc of illumination. By using the electric motor 36 to rotate the motor drive shaft 38 in a clockwise or counterclockwise rotation, the overall shielding of the light source may be continuously varied between the open position and the closed position. Of course, it is contemplated that the directions of rotation could be reversed, such that a clockwise rotation of the motor drive shaft 38 serves to move the first fan gear 68 and the second fan gear 70 into a "closed" position, and a counterclockwise rotation of the motor drive shaft 38 serves to move the first fan gear 68 and the second fan gear 70 into an "open" position.

Figure 7:
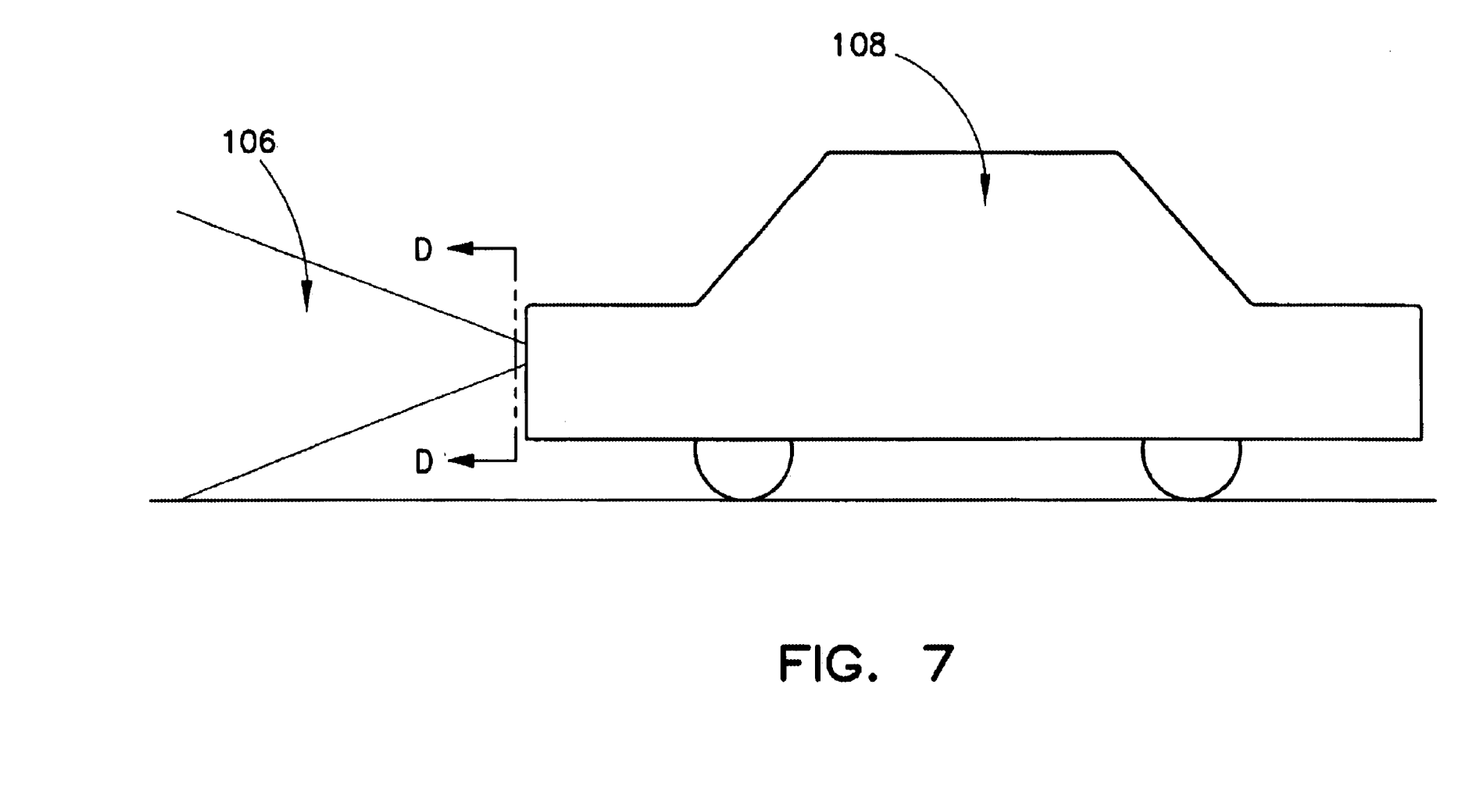
FIG. 7 is a side view of a vehicle projecting an illuminated beam from a headlamp.
Figure 8:
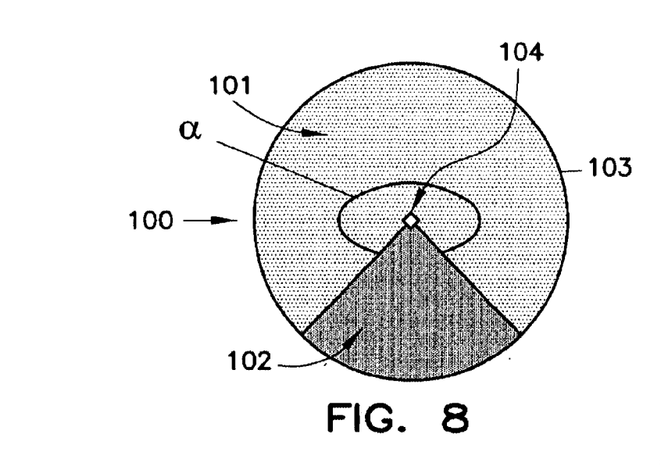
FIG. 8 is an exemplary cross sectional view of the beam along line D—D of FIG. 7, where the beam illumination pattern is in a large radial arc.
Figure 9:
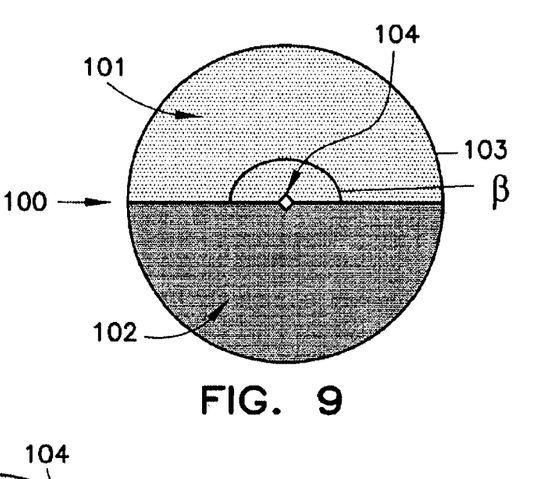
FIG. 9 is an exemplary cross sectional view of the beam along line D—D of FIG. 7, where the beam illumination pattern is in a medium radial arc.
Figure 10:
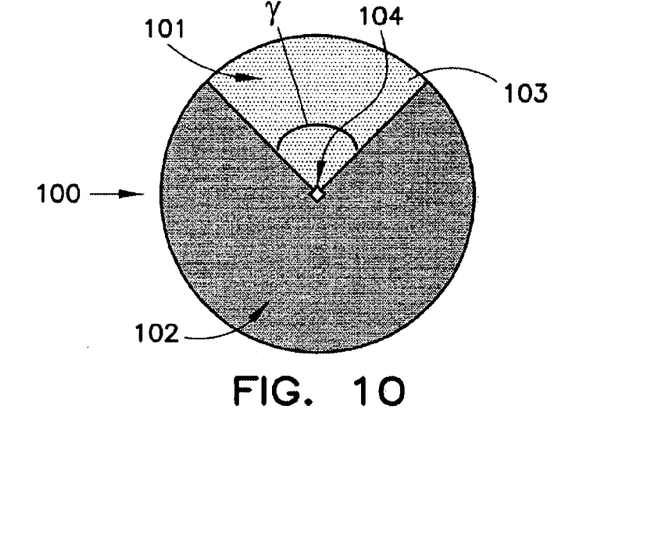
FIG. 10 is an exemplary cross sectional view of the beam along line D—D of FIG. 7, where the beam illumination pattern is in a small radial arc.

With reference to FIGS. 7, 8, 9, and 10, the concept of "variable radial arc of illumination" is discussed herein. FIG. 7 shows a model automobile 108, with at least one exemplary variable progressive beam headlamps installed therein. One of the at least one exemplary variable progressive beam headlamps project light in an illuminated beam 106 in a forward direction. Cross sectional views of the illuminated beam 106 along line D—D of FIG. 7 are illustrated in FIGS. 8, 9, and 10. These cross-sectional views represent an area taken from the illuminated beam that is very close to the automobile. As shown in FIGS. 8–10, each illuminated beam defines an illumination pattern 100 with a defined radial arc of illumination 103. It should be noted that the illuminated beam 106 as noted in FIG. 7 is only an approximation. It should further be noted that the cross sectional views of the illuminated beam illustrated in FIGS. 8, 9, and 10 are also approximations. In both instances, it should be understood that FIGS. 7–10 are provided to clarify the term "radial arc of illumination" and are not necessarily indicative of the illumination patterns from the variable progressive beam headlamp as described. Specifically, it should not be inferred that the radial arc of illumination of the variable progressive beam headlamp is limited to the arc of a circle, or is limited in cross section to be essentially circular.

FIGS. 8, 9, and 10 each illustrate illumination patterns 100 provided by the cross sectional views of the illuminated beam 106 as shown in FIG. 7. As such, each of the elements of FIGS. 8, 9, and 10 are labeled similarly. A reference point 104 is shown in the middle of each of the patterns. The reference point 104 represents the position of the lamp 78 relative to the reflector that provides the illumination pattern. The reference point 104 is typically the middle of the cross sectional view. An illuminated section 101 is shown, which indicates the lighted pattern in the cross sectional view. A non-illuminated section 102 is also shown, which indicates the non-lighted pattern in the cross sectional view. As shown in the illumination pattern of FIG. 8, the illuminated section 101 has an area greater than the non-illuminated section 102. As shown in FIG. 9, the illuminated section 101 has an area approximately equal to the non-illuminated section 102. As shown in FIG. 10, the illuminated section 101 has an area less than the non-illuminated section 102.

The illumination pattern shown in FIG. 8 is defined as having a greater radial arc of illumination than is shown in FIGS. 9 and 10. In particular, the angles $\alpha$, $\beta$ and $\gamma$ shown in FIGS. 8, 9 and 10, respectively, representative of the radial arc of illumination. Because the angle $\alpha$ is greater than $\beta$, the radial arc of illumination 103 of FIG. 8 is greater than FIG. 9. Likewise, because the angle $\beta$ is greater than $\gamma$, the radial arc of illumination 103 of FIG. 9 is greater than FIG. 10.

Figure 3:
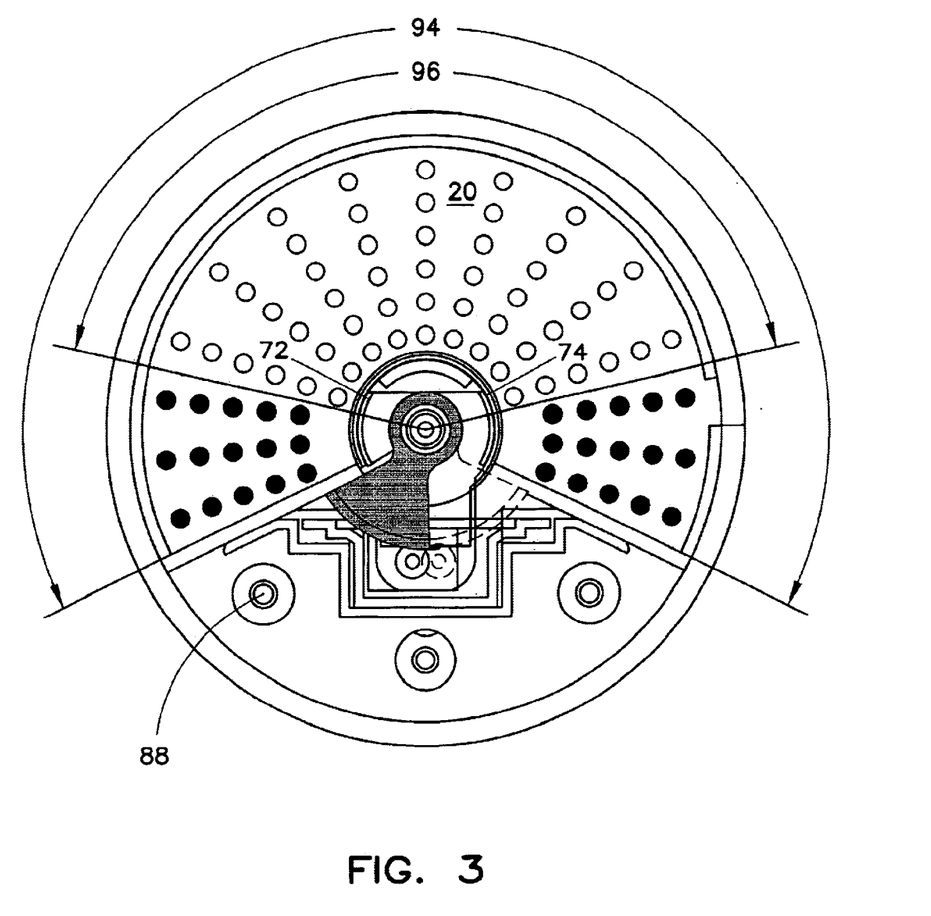
FIG. 3 is a front cross sectional view of the headlamp assembly of FIG. 1.

Referring now to FIG. 3, exemplary illumination patterns are shown from the front cross sectional view of the present invention. When first fan gear 68 and second fan gear 70 are located in a "closed" position, the first lamp shield 72 and the second lamp shield 74 are positioned for maximum lamp shielding, and the only light emitted from the headlamp is that reflected off the portion of the inside reflective surface of the housing 20 indicated by arc 96. This portion of the reflector is also represented in FIG. 3 by open circles. A "closed" position also indicates a smaller radial arc of illumination. When first fan gear 68 and second fan gear 70 are located in an "open" position, the first lamp shield 72 and the second lamp shield 74 are positioned for minimum lamp shielding, and the light emitted from the headlamp is that reflected off the portion of the inside reflective surface of the housing 20 indicated by arc 94 and represented in FIG. 3 by the combination of open circles and closed circles. An "open" position also indicates a larger radial arc of illumination.

The electric motor 36 is operable to move the motor drive shaft 38 in very small rotational increments, so the first fan gear 68 and second fan gear 70, and with them the first lamp shield 72 and second lamp shield 74, may be continuously rotated between the "open" and "closed" positions. To this end, the variable progressive beam headlamp is operable to continuously vary the radial arc of light emitted from the headlamp between a small radial arc and a larger radial arc.

As can be readily seen, the present invention of varying the radial arc of emitted light from a headlamp assembly 18 creates a unique stylization for a headlamp. Utilizing the present invention as a headlamp in an automobile may lend an impressive extra feature to the automobile's list of available features. The present invention may also add useful functionality to a headlamp, by allowing the headlamp to use a single bulb to vary angles of illumination or to selectively project light onto surfaces.

Figure 11:
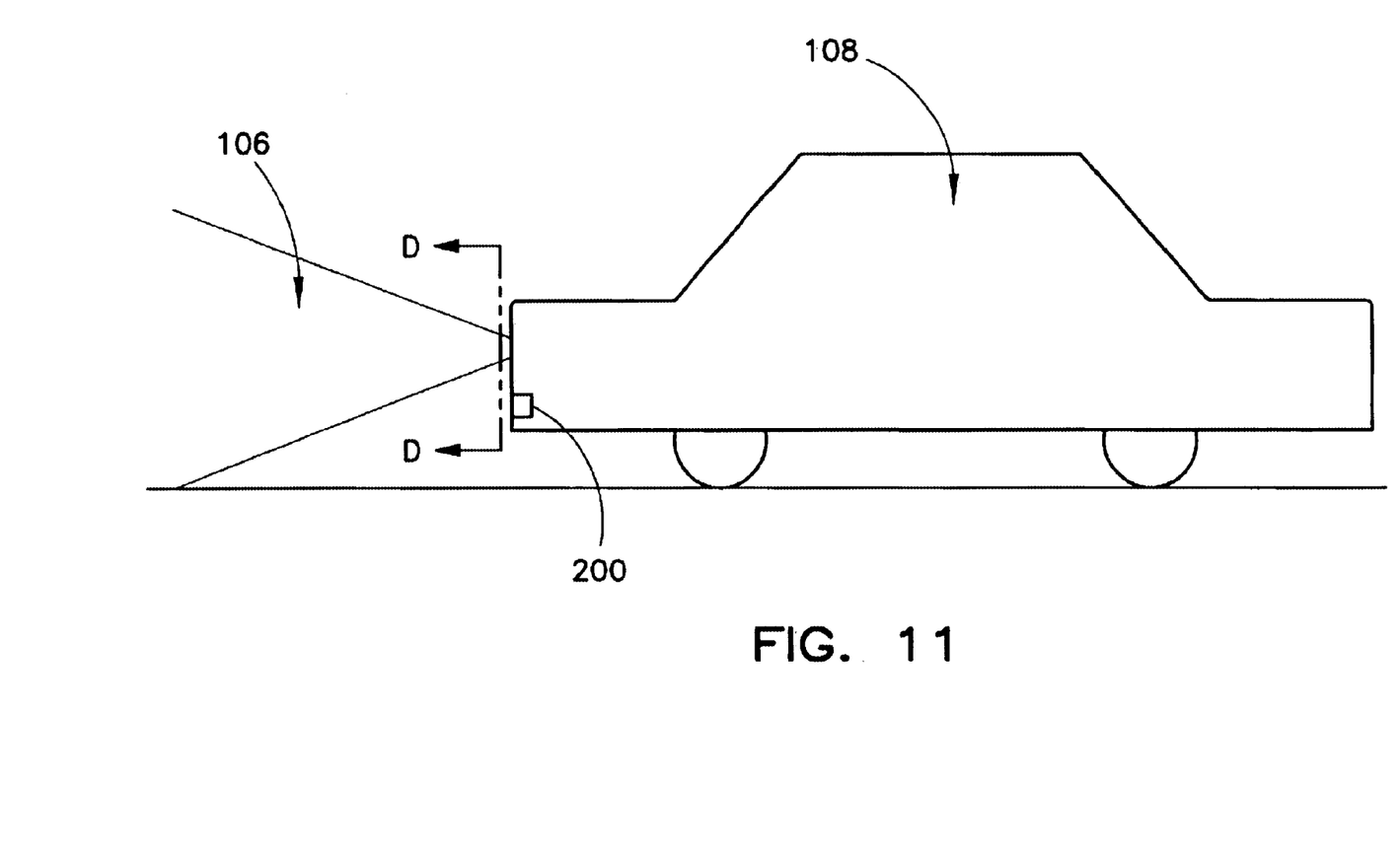
FIG. 11 is a side view of a vehicle projecting an illuminated beam from a headlamp, and utilizing an automatic dimming device.

With reference to FIG. 11, in an alternate embodiment, the headlamp control system (not shown) receives input from a light sensor 200 (or automatic dimming device) mounted on the front of the automobile. The sensor 200 is pointed forward from the automobile and positioned such that the sensor 200 detects light from the headlamps of oncoming traffic. The sensor 200 is operable to detect the amount (and/or intensity) of light received from an oncoming automobile. The sensor is capable of providing an output that quantifies the amount of light received by the sensor 200 and the output is delivered to the headlamp control system. The headlamp control system then uses this input to adjust the bulb shields 72 and 74. In particular, when light from the headlamps of oncoming traffic is received by the sensor 200, the headlamp control system may operate to rotate the bulb shields 72 and 74 about the lamp 78, reducing the amount of light projected from the headlamp 18, and shielding the oncoming traffic from dangerous glare. When little light is received by the sensor 200, the headlamp control system may operate to rotate the bulb shields 72 and 74, to maximize the projected light from the headlamp 18. Accordingly, the variable progressive beam headlamp may be used to provide an automatic headlamp adjustment feature that improves the safety of automobile operation. This adjustment feature provides a continuously decreasing beam pattern from high beam to low beam when the automobile encounters oncoming traffic. When the system does not detect oncoming traffic, the adjustment feature returns the headlamp to a high beam position (or if only distant traffic is detected, returns the headlamp to some intermediate beam pattern between low beam and high beam, such as a "motorway" beam pattern). Therefore, the automatic adjustment feature not only provides a safety device that prevents glare for an oncoming driver, but also provides automatic optimized roadway lighting, based on vehicle proximity, which serves to reduce driver eye and general fatigue.

Although other advantages may be found and realized and various modifications may be suggested by those versed in the art, it is understood that the present invention is not to be limited to the details given above, but rather may be modified within the scope of the appended claims.

What is claimed is:

1. A variable beam headlamp comprising:
   a. a housing;
   b. a lamp positioned within the housing;
   c. a first lamp shield partially surrounding the lamp;
   d. a second lamp shield partially surrounding the lamp; and
   e. at least one actuator in communication with the first lamp shield and the second lamp shield and operable to rotate the first lamp shield and the second lamp shield radially about the lamp.

2. A variable beam headlamp as in claim 1, further comprising a reflector arranged and disposed in the housing to reflect light emitted from the lamp out of the housing.

3. A variable beam headlamp as in claim 1, where the actuator is attached to a support structure, attached to the housing, and where the actuator is comprised of a first drive gear in communication with a first fan gear, and a second drive gear in communication with a second fan gear, where the first fan gear is in communication with the first lamp shield and the second fan gear is in communication with the second lamp shield.

4. A variable beam headlamp as in claim 3, wherein the first drive gear and the second drive gear are in communication, and the actuator is further comprised of an electric motor operable to rotate a motor drive shaft that is in communication with the first drive gear.

5. A variable beam headlamp as in claim 4, wherein the electric motor is operable to rotate the motor drive shaft in small angular increments, thereby enabling the first lamp shield and the second lamp shield to be continuously variable between a first position and a second position, where the first position projects a larger radial arc of illumination, and the second position projects a smaller radial arc of illumination.

6. A variable beam headlamp as in claim 1, wherein the actuator is under the control of a human operator.

7. A variable beam headlamp as in claim 1, wherein the actuator is under the control of a microprocessor which receives input from a light sensor.

8. A variable beam headlamp as in claim 1, further comprising a decorative cap attached to the support structure.

9. A variable beam headlamp as in claim 1, wherein the lamp is selected from the group consisting of an incandescent lamp, a halogen lamp, a high-intensity gas discharge lamp, and at least one light emitting diode (LED) lamp.

10. A variable beam headlamp comprising:
    a. a housing;
    b. a support structure attached to the housing;
    c. a lamp arranged and disposed within the housing;
    d. a first lamp shield partially surrounding the lamp;
    e. a second lamp shield partially surrounding the lamp;
    f. a first drive gear in communication with the first lamp shield, such that movement of the first drive gear imparts movement to the first lamp shield;
    g. a second drive gear in communication with the second lamp shield and the first drive gear, such that movement of the second drive gear imparts movement to the second lamp shield; and
    h. an electric motor attached to the support structure, the electric motor having a motor drive shaft in communication with the first drive gear.

11. The variable beam headlamp of claim 10, wherein the electric motor rotates the motor drive shaft in small increments, thereby enabling the first lamp shield and the second lamp shield to be continuously variable between a first position and a second position, where the first position projects a larger radial arc of illumination, and the second position projects a smaller radial arc of illumination.

12. A method of varying the amount of light emitted from a headlamp comprising the steps of:
    a. providing a housing, a lamp positioned within the housing, at least one lamp shield surrounding the lamp, and an actuator used to rotate the at least one lamp shield;
    b. energizing the lamp such that a beam of light is emitted from the housing, the beam of light having a first radial arc of illumination; and
    c. moving the at least one lamp shield about the lamp such that the first radial arc of illumination changes to a second radial arc of illumination.

13. The method of claim 12, wherein the radial arc of illumination is continuously variable between the first radial arc of illumination and the second radial arc of illumination.

14. A variable beam headlamp comprising:
    a. a housing;
    b. a lamp positioned within the housing;
    c. a shield arranged and disposed about the lamp to partially shield light emitted from the lamp; and
    d. means for moving the shield to provide a variable radial arc of illumination.

15. A variable beam headlamp as in claim 14, where the means for moving the shield is comprised of a drive gear and a fan gear, where the drive gear is in communication with the fan gear, and where the shield is attached to the fan gear.

16. A variable beam headlamp as in claim 15, where the means for moving the shield is further comprised of an electric motor in communication with the drive gear, the electric motor operable to rotate the drive gear.

17. A variable beam headlamp as in claim 14, where the means for moving the shield is continuously adjustable between a first position and a second position, where the first position projects a high radial arc of illumination, and the second position projects a low radial arc of illumination.

18. A headlamp comprising:
   a. a lamp for emitting light;
   b. a reflector positioned to reflect light emitted from the lamp into a beam of light having a radial arc of illumination; and
   c. a moveable shield arranged and disposed to block light emitted from the lamp and change the radial arc of illumination.

19. The headlamp of claim 18 further comprising an actuator connected to the moveable shield, the actuator operable to move the shield between a first position that results in a first radial arc of illumination and a second position that results in a second radial arc of illumination.

20. A headlamp comprising:
   a. a lamp for emitting light;
   b. a reflector positioned to reflect light emitted from the lamp into a beam of light;
   c. a moveable shield arranged and disposed to block light emitted from the lamp and adjust the beam of light between a high beam and a low beam; and
   d. a light sensor in communication with the moveable shield, the light sensor operable to produce an output, wherein the moveable shield adjusts the beam of light between the high beam and the low beam based on the output from the light sensor.

21. The headlamp of claim 20 wherein the moveable shield is operable to continually adjust the beam of light between the high beam and the low beam positions depending upon the amount of light received from the light sensor.

22. The headlamp of claim 20 wherein the beam of light includes a radial arc of illumination and the moveable shield adjusts the beam of light between the high beam and the low beam positions by adjusting the radial arc of illumination.

23. A method of varying the amount of light emitted from a headlamp comprising the steps of:
   a. providing a housing, a lamp positioned within the housing, at least one lamp shield surrounding the lamp, an actuator used to rotate the at least one lamp shield, and a light sensor operable to produce an output;
   b. energizing the lamp such that a beam of light is emitted from the housing; and
   c. moving the at least one lamp shield about the lamp to adjust the beam of light between a high beam and a low beam, based on the output from the light sensor.

24. The method of claim 23 wherein the step of moving the at least one lamp shield comprises continually adjusting the at least one lamp shield to continually adjust the beam of light between the high beam and the low beam positions depending upon the amount of light received from the light sensor.

25. The method of claim 23 wherein the beam of light includes a radial arc of illumination and the at least one lamp shield adjusts the beam of light between the high beam and the low beam positions by adjusting the radial arc of illumination.

* * * * *